(12) United States Patent
Cattaneo

(10) Patent No.: US 8,716,369 B2
(45) Date of Patent: May 6, 2014

(54) REINFORCED COMPOSITE MATERIAL, METHOD OF PREPARING THE SAME, ITS USE FOR PREPARING MANUFACTURED PRODUCTS, AS WELL AS MANUFACTURED PRODUCTS FORMED IN THIS WAY AND THEIR USE

(75) Inventor: Gian Luigi Cattaneo, Crema (IT)

(73) Assignee: Fratelli Bigaran di Bigiran Dario e Mario & C.S.A.S, Allessandria (IT)

( * ) Notice: Subject to any disclaimer, the term of this patent is extended or adjusted under 35 U.S.C. 154(b) by 0 days.

(21) Appl. No.: 13/580,916

(22) PCT Filed: Feb. 23, 2011

(86) PCT No.: PCT/IB2011/050741
§ 371 (c)(1),
(2), (4) Date: Aug. 23, 2012

(87) PCT Pub. No.: WO2011/104670
PCT Pub. Date: Sep. 1, 2011

(65) Prior Publication Data
US 2012/0322919 A1    Dec. 20, 2012

(30) Foreign Application Priority Data
Feb. 24, 2010 (IT) .............. MI2010A0291

(51) Int. Cl.
*C04B 7/32* (2006.01)
*B28B 1/08* (2006.01)

(52) U.S. Cl.
USPC .................................... 524/3; 264/71

(58) Field of Classification Search
USPC .................................... 524/3; 264/71
See application file for complete search history.

(56) References Cited

U.S. PATENT DOCUMENTS

| | | | |
|---|---|---|---|
| 4,755,228 A | 7/1988 | Sakurai et al. | |
| 4,898,769 A | 2/1990 | Laflin et al. | |
| 2003/0017299 A1* | 1/2003 | Matsui et al. | .......... 428/98 |
| 2004/0198871 A1* | 10/2004 | Yamashita et al. | .......... 524/2 |

FOREIGN PATENT DOCUMENTS

| | | |
|---|---|---|
| DE | 35 22 588 A1 | 1/1987 |
| DE | 267 249 A1 | 4/1989 |
| FR | 2 778 787 A1 | 11/1999 |
| FR | 2 785 604 A1 | 5/2000 |
| FR | 2 900 653 A1 | 11/2007 |
| GB | 2 190 371 A | 11/1987 |
| GB | 2 218 670 A | 11/1989 |
| JP | 55-080762 A | 6/1980 |

\* cited by examiner

*Primary Examiner* — John Uselding
(74) *Attorney, Agent, or Firm* — Sughrue Mion, PLLC

(57) ABSTRACT

A reinforced composite material based on aluminous cement and tabular alumina or corundum, reinforced with glass-fibres, method of preparing the same, its use for preparing manufactured products, as well as manufactured products formed in this way and their use.

20 Claims, No Drawings

REINFORCED COMPOSITE MATERIAL, METHOD OF PREPARING THE SAME, ITS USE FOR PREPARING MANUFACTURED PRODUCTS, AS WELL AS MANUFACTURED PRODUCTS FORMED IN THIS WAY AND THEIR USE

CROSS REFERENCE TO RELATED APPLICATIONS

This application is a National Stage of International Application No. PCT/IB2011/050741 filed Feb. 23, 2011, claiming priority based on Italian Patent Application No. MI2010A000291, filed Feb. 24, 2010, the contents of all of which are incorporated herein by reference in their entirety.

FIELD OF THE INVENTION

The present invention refers to a reinforced composite material based on a cement matrix having improved electrical resistance and electrical insulation properties and thermal insulation properties, while keeping at the same time good mechanical properties enabling the workability of said composite material, as well as the manufacture of bodies and manufactured products based on said reinforced composite by moulding processes based on the use of silicone moulds.

STATE OF THE ART

Over the years, composite materials based on cement have been developed comprising, as backings, reinforcements made of glass filament rovings, said reinforcements being mechanically assembled and dipped in a cement mixture during the setting step of the same, wherein the percentage by weight of said composite materials of said reinforcements is at least of 5% by weight with a weight per unit area of 850 g/m$^2$ (U.S. Pat. No. 4,898,769, UK Patent Application GB 2 218 670 A).

Said materials had good electrical insulation properties, but they were inadequate in terms of mechanical properties, especially when they were subjected to working for obtaining finished manufactured products having the desired profiles. Particularly, these materials characterized by said rovings made of fabric of glass fibres parellally arranged at few millimeters one from the other, experience a substantial degradation of their mechanical properties when they are subjected to the requisite mechanical-type workings, such as millings, in order to obtain manufactured products or finished products having the suitable application shape, but characterized by a very low mechanical strength. In fact, since such workings destroy or substantially weaken the scaffolding of the overlapped rovings, they reduce so much the mechanical properties that they cause, also during the workings, very significant amounts of scraps and defects, which are sometimes unsustainable, when the profiles to be obtained are complex. Moreover, these mechanical workings determine very high costs, as well as determine great quantities of dust, which require ponderous anti-pollution facilities, to protect the health and the environment.

So, it was strongly felt the necessity to obtain composite materials based on reinforced cement, capable of satisfactorily combine mechanical, electrical and thermal properties while obviating the above-mentioned serious disadvantages typical of the materials of the prior art.

SUMMARY OF THE INVENTION

The Applicant, by continuing the research in the present technical field, has surprisingly and unexpectedly obtained a new reinforced composite material based on an aluminous cement and tabular alumina or corundum, reinforced with glass fibres, as well as a body or manufactured product made of refractory, or a body or manufactured product made of thermal/electrical insulator based on said reinforced composite material. A further object of the present invention is a method of preparing a reinforced composite material based on aluminous cement and tabular alumina or corundum, reinforced with glass fibres, as well as a process of preparing a body or manufactured product made of refractory, or a body or manufactured product made of electrical/thermal insulation based on said reinforced composite material.

It is a further object of the present invention the use as: plates for blow-out chambers, in particular blow-out chambers for high-voltage contactors, high temperature- and voltage-resistant insulating plates, ribbed isolators, holders for electrical resistances as well as coatings for high temperature ovens and pipes for heat exchangers, of bodies or manufactured products made of refractory or electrical/thermal insulators as above described, the latter being a further object of the present invention.

DETAILED DESCRIPTION OF THE INVENTION

It is therefore an object of the present invention a reinforced composite material based on aluminous cement and tabular alumina or corundum, reinforced with glass-fibres, said composite material comprising:
high alumina cement with not less than 70% in $Al_2O_3$
tabular alumina or corundum
silica and zircon-based glass fibres
silicone resin
polyacrylic electrolyte
and water as hydraulic binder.

More particularly, the silica and zircon-based glass fibres are 5-10 mm in length, more preferably 6-9 mm. More particularly, the high alumina cement, according to the present invention, is preferably a cement with high refractory properties, i.e. an aluminous cement with a thermal resistance or refractory higher than 1700° C. More particularly, the tabular alumina or corundum, according to the present invention, is preferably tabular alumina or corundum with a grain-size distribution not higher than 0.4 mm, more preferably tabular alumina or corundum with a grain-size distribution not higher than 0.3 mm, most preferably tabular alumina or corundum with a grain-size distribution between 0.3 and 0.1 mm.

More particularly, as a further preferred embodiment of the composite material according to the invention, the tabular alumina or corundum has at least a 98.0% purity, preferably at least 99.5%.

In a still more preferred embodiment of the reinforced composite material, object of the present invention, silica and zircon-based glass fibres, according to the present invention, are fibres with a density comprised between 2.5 and 2.7 g/cm$^3$, and still more particularly, silica and zircon-based glass fibres are present in a weight amount comprised between 0.1 and 0.15 g/cm$^3$, more preferably between 0.11 and 0.12 g/cm$^3$ of the composite material according to the present invention, more particularly, silica and zircon-based glass fibres are present in an amount comprised between 800 and 1200/cm$^3$, more preferably between 900 and 1100/cm$^3$ of the composite material according to the present invention.

In a preferred embodiment of the reinforced composite material based on aluminous cement and tabular alumina or corundum, reinforced with glass fibres object of the present invention, the high aluminous cement is in a percentage between 22 and 27% by weight, more preferably between 24 and 26% by weight, the tabular alumina is in a percentage between 58 and 63% by weight, preferably between 60 and 62% by weight, the glass fibres are in a percentage between 3.9 and 4.5% by weight, preferably between 4.1 and 4.4% by weight, the silicone resin is in a percentage between 0.14 and 0.18% by weight, more preferably between 0.15 and 0.17% by weight, the polyacrylic electrolyte is in a percentage between 0.14 and 0.18% by weight, more preferably between 0.15 and 0.17% by weight, the remaining part being water, provided as an hydraulic binder, said percentages being computed on 100 parts by weight of composite material, object of the present invention.

In a particularly preferred embodiment of the reinforced composite material based on aluminous cement and tabular alumina or corundum, reinforced with glass fibres, object of the present invention, said reinforced composite material is obtained/obtainable by a process comprising the following steps:
 a) mixing in water, under continuous stirring, in presence of silicone resin and polyacrylic electrolyte, previously dispersed, high alumina cement, with not less than 70% in $Al_2O_3$, and tabular alumina or corundum, followed by adding, still under stirring, silica and zircon-based glass fibres, to produce a slurry;
 b) casting the slurry obtained in step a) in moulds or containers kept vibrating;
 c) "Setting" or hardening the slurry obtained in step a) after casting, followed by mould releasing and aging, through subsequent processes of: conditioning at controlled temperature and moisture, air-drying and conditioning in a forced convection oven.

It is a further object of the present invention the method of preparing the reinforced composite material based on aluminous cement and tabular alumina or corundum, reinforced with glass fibres, object of the present invention, said method comprising the steps a), b) and c) as above described.

In a preferred embodiment of the reinforced composite material based on aluminous cement and tabular alumina or corundum, reinforced with glass fibres, object of the present invention, as well as the corresponding manufacturing method as before described, during the step a) of mixing in water, the silicone resin is dispersed as an aqueous emulsion and the polyacrilic electrolyte as an aqueous solution.

According to a preferred embodiment of the reinforced composite material based on aluminous cement and tabular alumina or corundum, reinforced with glass fibres object of the present invention, as well as the corresponding manufacturing process as above described, in step a) of mixing in water, the high-aluminous cement is in a percentage between 23 and 27% by weight, more preferably between 20 and 25% by weight, the tabular alumina is in a percentage between 55 and 60% by weight, preferably between 53 and 57% by weight, the glass fibres are in a percentage between 3.5 and 4.5% by weight, preferably between 4.0 and 4.5% by weight, the silicone resin (active portion) is in a percentage between 0.12 and 0.19% by weight, more preferably between 0.14 and 0.17% by weight, the polyacrylic electrolyte (active portion) is in a percentage between 0.11 and 0.18% by weight, more preferably between 0.13 and 0.16% by weight, the remaining part being water, said percentages being computed on 100 parts by weight of the resulting slurry.

In a further particularly preferred embodiment of the reinforced composite material according to the present invention, as well as the corresponding manufacturing method as described before, in the step a) of mixing in water, the high-aluminous cement is in a percentage between 23 and 27% by weight, more preferably between 20 and 25% by weight, the tabular alumina is a percentage between 55 and 60% by weight, preferably between 53 and 57% by weight, the glass fibres are in a percentage between 3.5 and 4.5% by weight, preferably between 4 and 4.5% by weight, the silicone resin is in a percentage, as aqueous emulsion, between 0.22 and 0.27%, more preferably between 0.24 and 0.26% by weight, the polyacrilic electrolyte is present as an aqueous solution, with a percentage of said solution comprised between 0.38 and 0.44% by weight, more preferably between 0.40 and 0.43% by weight, the remaining being water, said percentages being computed on 100 parts by weight of the resulting slurry.

Glass fibres based on silica and zircon according to the present invention are glass fibres well known in the art, since they are glass fibres which are made alkali-resistant by zirconium present in the form of zirconia or zirconium oxide, generally they are glass fibres comprising a percentage of zirconia between 10-25%, preferably 12-20%, more preferably 13-15% by weight of the glass fibres.

In said glass fibres, the silica component $SiO_2$ is predominant because it can vary from 55% to 75%, from 60% to 70% by weight of the fibres, and wherein it is present a very low portion of flux components, such as mainly calcium and sodium oxide, at most 20% by weight of fibres.

By expressing said percentages with reference to $SiO_2$ and zircon, i. e. zirconium silicate $Zr(SiO_4)$, such percentages can be expressed as: 14-36% $ZrSiO_4$ and 66-44% $SiO_2$, 17-29% $ZrSiO_4$ and 63-51% $SiO_2$, 18-22% $ZrSiO_4$ and 62-58% $SiO_2$, in all these examples, the remaining percentage comprising flux components.

The glass fibres make the resultant composite very mechanically strong.

Moreover, the flexural failure occurs pseudo-plastically, this term means that after having reached the peak load, there is a marked softening branch devoid of catastrophic breakdown.

Indeed, the specimens made of composite material, according to the present invention, during the flexural strength test, break pseudo-plastically, this term means that the load-displacement plot shows, after an initial rectilinear trend, a monotonic upward slope with a decreasing derivative (pseudo-hardening) to the maximum load, after the maximum load it follows then a somewhat marked "softening" branch, this feature prevents a drastic breakdown of the manufactured product.

The polyacrylic electrolyte promotes a better structural homogeneity, a lower porosity, and therefore better general performances in terms of mechanical and arc resistances.

The tabular alumina combined with the high aluminous cement provides a very high refractory, high mechanical strength and excellent dielectric properties.

The silicone resin spreads homogeneously in the composite material according to the present invention and provides to the latter optimal hydrophobic properties and an improvement of the thermal and electrical insulation properties thereof.

Water as hydraulic binder means the hydratation water remained in the reinforced composite material at the end of the method of preparing and forming the composite itself.

A further object of the present invention is the slurry for obtaining the reinforced composite material based on a aluminous cement and tabular alumina or corundum, reinforced with glass fibres, said slurry comprising water, high aluminous cement containing not less than 70% $Al_2O_3$:
 tabular alumina or corundum,
 glass fibres based on silica and zircon,
 silicone resin,
 polyacrylic electrolyte.

The resultant composite material obtained/obtainable according to the present invention comprises therefore high aluminous cement with not less than 70% $Al_2O_3$,
tabular alumina or corundum,
glass fibres based on silica and zircon,
silicone resin,
polyacrylic electrolyte.

In still more preferred further embodiments of the reinforced composite material according to the present invention, as well as of corresponding manufacturing method, as described before, in step a) of mixing in water, when the silicone resin is dispersed in the form of an aqueous emulsion, said silicone resin aqueous solution preferably comprises between 50 and 70% by weight of resin, even more preferably a 60% emulsion by weight of resin and/or when the polyacrylic electrolyte is dispersed in the form of an aqueous solution, said polyacrylic electrolyte aqueous solution preferably comprises between 25 and 45% by weight of acrylic electrolyte, even more preferably a 35% aqueous solution by weight of acrylic electrolyte and/or the high alumina cement has a percentage of not less than 72% of $Al_2O_3$ and/or tabular alumina or corundum has at least 98.0% purity, preferably at least 99.5% and/or said tabular alumina or corundum has a grain-size distribution not higher than 0.4 mm, preferably not higher than 0.3 mm, even more preferably a grain-size distribution between 0.3 and 0.1 mm and/or the silica and zircon-based glass fibres are 5-10 m in length, preferably between 6 and 9 mm.

In still more preferred further embodiments of the reinforced composite material according to the present invention, as well as of the corresponding manufacturing method, as described before, in the step b) of casting, the mould or container is continuously or intermittently vibrated, preferably at a constant frequency, with the aim of promoting an homogeneous and anisotropic distribution of the fibres with a partial alignment of the same, as well as the removal of air bubbles.

The moulds or containers of the step b) are made of metal, ceramic, wood/cellulose, plastic, particularly silicone or combinations thereof.

In still more preferred further embodiments of the reinforced composite material, according to the present invention, as well as of the corresponding manufacturing method, as described before, in the step c) the hardening or setting is performed by leaving the material at rest for at least 24 hours and/or preferably in a temperature-controlled room at 20° C. and with controlled moisture; during the aging, the conditioning is performed in temperature-controlled cabinets/rooms at controlled moisture, preferably at a 95% moisture, preferably for 5 days and/or air drying is performed for at least 10 days and/or the conditioning in a forced convection oven is performed with a ramp up to 105° C., preferably with a cycle of 20-24 hours. The reinforced composite material, object of the present invention, combines, besides the improved properties of optimal resistance to high voltages, high resistance to thermal shocks, with a good mechanical strength, also the absence of shrinkage phenomenon during the hardening or setting step as well as a substantial chemical inertness.

This allows the use of moulds having high tolerances and an exceptional accuracy and therefore to obtain manufactured products, made of said reinforced composite material, with a very high qualitative standard of the size reproducibility, while fulfilling the tolerances, and a very high surface accuracy.

It is therefore another object of the present invention:
a manufactured product made of reinforced composite material based on an aluminous cement and tabular alumina or corundum, reinforced with glass fibres according to the present invention, as described before,
a method of manufacturing a manufactured product made of a composite reinforced material based on aluminous cement and tabular alumina or corundum, reinforced with glass fibres, said method comprising the steps of:
a) mixing in water, under continuous stirring, in presence of silicone resin and polyacrylic electrolyte, previously dispersed, of high alumina cement, with not less than 70% in $Al_2O_3$, and tabular alumina or corundum, followed by adding, still under stirring, silica and zircon-based glass fibres, to produce a slurry;
b) casting the slurry obtained in step a) in moulds or containers kept vibrating;
c) "Setting" or hardening the slurry obtained in step a) after casting, followed by mould releasing and aging, through subsequent processes of: conditioning with controlled temperature and moisture, air-drying and conditioning in a forced convection oven;
in this process, steps a), b) and c) have the same features of steps a), b) and c) of the method of preparing the reinforced composite material, preferably in step a) of mixing in water, the silicone resin has been dispersed in an aqueous emulsion and the polyacrilic electrolyte as an aqueous solution and/or, more preferably, the mould or container of step b) is made of silicone material, the glass fibres based on silica and zircon used in step a) are in a length comprised between 5-10 mm, preferably between 6-9 mm, and the grain-size distribution of the tabular alumina or corundum used in the step a) is not more than 0.4 mm, preferably no more than 0.3, and more preferably between 0.1 and 0.3 mm;
the use of a manufactured product made of a reinforced composite material based on aluminous cement and tabular alumina or corundum, reinforced with glass fibres according to the present invention as plates for blow-out chambers, particularly blow-out chambers for high-voltage contactors, arc-, high temperature- and high current-resistant insulating plates, ribbed isolators, resistance holders, as well as high-temperature furnace coatings and heat exchanger pipes.

The reinforced composite material and the manufactured products made with said composite material show improved of electrical resistance and electrical insulation properties and thermal insulation properties and good properties of mechanical strength in comparison with the available materials of the prior art.

It is therefore a further object of the present invention the use of the composite material according to the present invention as a refractory material and/or as electrical and/or thermal insulation materials.

Particularly, the reinforced composite material, object of the present invention, as well as the manufactured products made of said material, show: a flexural mechanical strength (measured according to the UNI EN ISO 178 standard) more than 30±1.2 MPa, an arc resistance (measured according to the ASTM D495 standard) more than 450 sec, a dielectric strength (measured according to the IEC 60243 standard) more than 2.60 kV/mm, as well as further improved properties with respect to the properties shown, with identical measurement conditions according to the cited standards, by the present marketed materials such as the composite material "Refraver" from TENMAT. The value of the dielectric rigidity for the material Refraver, determined, with the same measurement conditions, according to the IEC 60234 standard, is not more than 1.7 Kv/mm.

Said further specific properties of the reinforced composite material according to the present invention, are schematically set forth in the following Table 1:

TABLE 1

| CHARAC-TERISTICS | STANDARDS | MEA-SURES | VALUES |
|---|---|---|---|
| IMPACT-FLEXURAL STRENGTH | UNI-EN-ISO-179-1 | KJ/m$^2$ | >14 |
| FLEXURAL STRENGTH | UNI-EN-ISO-178-2006 | MPa | >30 |
| COMPRESSION STRENGTH | UNI-EN-ISO-178-2006 | MPa | >60 |
| MODULUS OF ELASTICITY | UNI 6556 | GPa | >40 |
| DIELECTRIC STRENGTH | CEI-EN 60672 | Kv/mm. | >2.5 |
| ARC RESISTANCE | CEI 15-9 §6.3.01 and CEI/IEC 61621 | | COMPLYING |
| RESISTANCE TO THE VOLTAGE APPLIED BETWEEN THE PLUG PINS | CEI 15-9 §6.1.01 | | COMPLYING |

The reinforced composite material and the manufactured products made of the same material, object of the present invention, show the following apparent advantages: the above-the-standard arc resistance, high thermal shock resistance, good mechanical strength coupled to an improved tendency to the workability, the latter being due to the structural characteristics of the reinforced composite material and consequently to the method of its preparation and of preparing the manufactured products made of said reinforced composite material. Indeed, simultaneously to the attainment of the above-mentioned improved electrical, thermal and mechanical properties of the material and the manufactured products made of the same, it follows a better simplicity of producing the manufactured products made of said material, the manufactured products having a very high qualitative standard with a size reproducibility according to the tolerances and a superior accuracy of the surfaces of the manufactured product, all that is obtained without the shrinkage phenomenon of the reinforced composite material according to the present invention during the setting or hardening step of what is received in the moulds or containers; the cement component of the composite does not chemically attack the moulds; immediate release of the composite, and therefore of the manufactured product made of the same, after its hardening, from the moulds; the possibility of using silicone moulds.

The following non limiting examples describe embodiments of the invention.

EXAMPLE OF EMBODIMENT 1

2000 g consisting of 30% (600 g) of aluminous cement containing 70% Al$_2$O$_3$, and 70% (1400 g) tabular alumina having a grain-size distribution comprised between 0.1 and 0.3 mm and a 98.0% purity, mixed with 100 g of silica and zircon based glass fibres of 6 mm in length, are mixed with 300 g of water, wherein before 6 g of an aqueous emulsion of 60% silicon resin and 10 g of a dispersant as an aqueous solution, of 35% ammonium polyacrylate as active substance, were dissolved. Having completed the mixing step, the fluid composite is poured in a silicon mould, kept vibrating.

The mould and the composite are located in a temperature-controlled room at 20° C., at a relative humidity of 95% for 24 hours.

The demoulded manufactured product, after aging by: treatment in a temperature-controlled cabinet conditioned with a controlled humidity at 95%, air-drying and a following conditioning in a forced convection oven with a ramp up to 105° C. with a cycle of 24 hours, is subjected to the characterizations according to the current standards for defining its technical characteristics summed up in the following Table 2.

TABLE 2

| CHARAC-TERISTICS | STANDARDS | MEA-SURES | VALUES |
|---|---|---|---|
| WATER ABSORPTION | UNI-EN-ISO-62-2001 | % | <2 |
| BULK DENSITY | UNI-EN-ISO-1183-1-2005 | g./cm$^3$ | 2.30 |
| IMPACT-FLEXURAL STRENGTH | UNI-EN-ISO-179-1 | KJ/m$^2$ | >14 |
| FLEXURAL STENGTH | UNI-EN-ISO-178-2006 | MPa | >30 |
| COMPRESSION STRENGTH | UNI-EN-ISO-178-2006 | MPa | >60 |
| MODULUS OF ELASTICITY | UNI 6556 | GPa | >40 |
| DIELECTRIC RIGIDITY | CEI-EN-60672 | Kv/mm. | >2.5 |
| ARC RESISTANCE | CEI 15-9 §6.3.01 and CEI/IEC 61621 | | COMPLYING |
| RESISTANCE TO VOLTAGE APPLIED ACROSS THE PLUG PINS | CEI 15-9 §6.1.01 | | COMPLYING |

EXAMPLE 2

Experimental Tests of the Mechanical Characterization

According to the procedures of manufacturing the composite object of the invention, of the example 1, five specimens having the following dimensions: length 80 mm, width 10 mm and thickness 4 mm were prepared.

The mechanical characterization performed at the CNR-ISTEC laboratory of Faenza, on specimens as before described, shows in correspondence of the flexural mechanical strength measured according to the UNI EN ISO 178 standard, an average value of 30±1.2 MPa for the five specimens.

EXAMPLE 3

Experimental Tests of the Electrical Characterization

According to the procedures of manufacturing the composite object of the invention, of the example 1, six square plates having dimensions: side 100 mm, thickness 3 mm, were prepared.

The electrical characterization tests performed at the electrical engineering department of the University of Genoa on plates as described before, show the following results:

Arc Resistance Tests

The arc resistance measured according to the ASTM D495 standard, and according to CEI/IEC 61621 standard shows average values greater than 450 sec (the plates, after the test, were still intact);

Dielectric Rigidity Tests

The dielectric rigidity, measured according to the IEC 60243 standard, gave average values more than 2.60 kV/mm.

The value of the dielectric rigidity for the material Refraver, determined, with the same measurement conditions, according to the IEC 60234 standard, is not more than 1.7 Kv/mm.

The invention claimed is:

1. A reinforced composite material based on aluminous cement and tabular alumina or corundum, reinforced with glass-fibres, said composite material comprising:
   highly alumina cement with not less than 70% in $Al_2O_3$
   tabular alumina or corundum
   silica and zircon-based glass fibres
   silicone resin
   polyacrylic electrolyte
   and water as hydraulic binder.

2. The composite material according to claim 1, wherein the silica and zircon-based glass fibres are 5-10 mm in length.

3. The composite material according to claim 1, wherein the high alumina cement is a cement with high refractory properties, i.e. an aluminous cement with a thermal resistance or refractoriness higher than 1700° C.

4. The composite material according to claim 1, wherein the tabular alumina or corundum is tabular alumina or corundum with a grain-size distribution not higher than 0.4 mm.

5. The composite material according to claim 1, wherein the high alumina cement is in a percentage between 22 and 27% by weight, the tabular alumina is in a percentage between 58 and 63% by weight, the glass fibres are in a percentage between 3.9 and 4.5% by weight, the silicone resin is in a percentage between 0.14 and 0.18% by weight, the polyacrylic electrolyte is in a percentage between 0.14 and 0.18% by weight, the remaining part being water, intended as a hydraulic binder, said percentages being computed on 100 parts by weight of composite material.

6. Reinforced composite material based on aluminous cement and tabular alumina or corundum, reinforced with silica and zircon-based glass fibres obtained by a proceeding comprising the following steps:
   a) mixing in water, under continuous stifling, in presence of silicone resin and polyacrylic electrolyte, previously dispersed, of high alumina cement, with not less than 70% in $Al_2O_3$, and tabular alumina or corundum, followed by adding, still under stifling, silica and zircon-based glass fibres, to produce a slurry;
   b) casting the slurry obtained in step a) in moulds or containers kept vibrating;
   c) "Setting" or hardening the slurry obtained in step a) after casting, followed by mould releasing and aging, through subsequent processes of: conditioning with controlled temperature and moisture, air-drying and conditioning in a forced convection oven.

7. The reinforced composite material according to claim 6, wherein in step a) of mixing in water the high-aluminous cement is in a percentage between 23 and 27% by weight, the tabular alumina is in a percentage between 55 and 60% by weight, the glass fibres are in a percentage between 3.5 and 4.5% by weight, the silicone resin (active portion) is in a percentage between 0.12 and 0.19% by weight, the polyacrylic electrolyte (active portion) is in a percentage between 0.11 and 0.18% by weight, the remaining part being water, said percentages being computed on 100 parts by weight of the resulting slurry.

8. The reinforced composite material according to claim 6, wherein, in step a) of mixing in water, the silicone resin is dispersed in the form of aqueous emulsion between 50 and 70% by weight of resin and/or the polyacrylic electrolyte is dispersed in the form of an aqueous solution between 25 and 45% by weight of electrolyte and/or the high alumina cement has a percentage of not less than 72% of $Al_2O_3$ and/or tabular alumina or corundum has at least 98.0% purity and/or said tabular alumina or corundum has a grain-size distribution not higher than 0.4 mm and/or the silica and zircon-based glass fibres are 5-10 m in length.

9. Method for preparing reinforced composite material based on aluminous cement and tabular alumina or corundum, reinforced with glass-fibres, said method comprising the steps:
   a) mixing in water, under continuous stifling, in presence of silicone resin and polyacrylic electrolyte, previously dispersed, of high alumina cement, with not less than 70% in $Al_2O_3$, and tabular alumina or corundum, followed by adding, still under stifling, silica and zircon-based glass fibres, to produce a slurry;
   b) casting the slurry obtained in step a) in moulds or containers kept vibrating;
   c) "Setting" or hardening the slurry obtained in step a) after casting, followed by mould releasing and aging, through subsequent processes of: conditioning with controlled temperature and moisture, air-drying and conditioning in a forced convection oven.

10. Manufactured product comprising the reinforced composite material based on aluminous cement and tabular alumina or corundum, reinforced with glass-fibres, according to claim 1.

11. Method for preparing a manufactured product comprising reinforced composite material based on aluminous cement and tabular alumina or corundum, reinforced with glass-fibres, said method according to claim 9 wherein the mould or container in step b) is in a silicone material, the silica and zircon-based glass fibres used in step a) are 5-10 mm in length and tabular alumina or corundum used in step a) has a grain-size distribution not higher than 0.4 mm.

12. A manufactured product comprising reinforced composite material, obtained with the method according to claim 11, said manufactured product selected from the group comprising plates for blow-out chambers, in particular plates for blow-out chambers for high-voltage contactors, arch-, high temperature- and high current-resistant insulating plates, ribbed isolator, resistance holders, as well as high-temperature furnace coatings and heat exchanger pipes.

13. An electric and/or thermal type of refractory material and/or isolator material comprising the reinforced composite material according to claim 1.

14. The composite material according to claim 2, wherein the silica and zircon-based glass fibres are 6-9 mm in length.

15. The composite material according to claim 4, wherein the tabular alumina or corundum is tabular alumina or corundum with a grain-size distribution not higher than 0.3 mm.

16. The composite material according to claim 15, wherein the tabular alumina or corundum is tabular alumina or corundum with a grain-size distribution between 0.3 and 0.1 mm.

17. The composite material according to claim 5, wherein the high alumina cement is in a percentage between 24 and 26% by weight, the tabular alumina is in a percentage between 60 and 62% by weight, the glass fibres are in a percentage between 4.1 and 4.4% by weight, the silicone resin is in a percentage between 0.15 and 0.17% by weight, the polyacrylic electrolyte is in a percentage between 0.15 and 0.17% by weight, the remaining part being water, intended as a hydraulic binder, said percentages being computed on 100 parts by weight of composite material.

18. The reinforced composite material according to claim 7, wherein in step a) of mixing in water the high-aluminous cement is in a percentage between 20 and 25% by weight, the tabular alumina is in a percentage between 53 and 57% by weight, the glass fibres are in a percentage between 4.0 and 4.5% by weight, the silicone resin, an active portion, is in a percentage between 0.14 and 0.17% by weight, the polyacrylic electrolyte, an active portion, is in a percentage between 0.13 and 0.16% by weight, the remaining part being water, said percentages being computed on 100 parts by weight of the resulting slurry.

19. The reinforced composite material according to claim 8, wherein, in step a) of mixing in water, the silicone resin is dispersed in the form of aqueous emulsion 60% by weight of resin and/or the polyacrylic electrolyte is dispersed in the form of an aqueous solution 35% by weight of electrolyte and/or the high alumina cement has a percentage of not less than 72% of Al2O3 and/or tabular alumina or corundum has at least 99.5% purity and/or said tabular alumina or corundum has a grain-size distribution not higher than 0.3 mm and/or the silica and zircon-based glass fibres are 6-9 mm in length.

20. A method of preparing a manufactured product comprising reinforced composite material based on aluminous cement and tabular alumina or corundum, reinforced with glass-fibres, said method comprising operations set forth in claim 11, wherein the silica and zircon-based glass fibres used in step a) are 6-9 mm in length and tabular alumina or corundum used in step a) has a grain-size distribution not higher than 0.3 mm.

\* \* \* \* \*